US012635712B2

(12) United States Patent
Degeer et al.

(10) Patent No.: US 12,635,712 B2
(45) Date of Patent: May 26, 2026

(54) METHOD OF PREPARING A COOKED CHUNK PET FOOD PRODUCT

(71) Applicant: Cargill, Incorporated, Wayzata, MN (US)

(72) Inventors: Staci Lynn Degeer, Wichita, KS (US); Morgan Nicole Gonzalez, Wichita, KS (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 18/566,353

(22) PCT Filed: Jun. 9, 2022

(86) PCT No.: PCT/US2022/032808
§ 371 (c)(1),
(2) Date: Dec. 1, 2023

(87) PCT Pub. No.: WO2022/261303
PCT Pub. Date: Dec. 15, 2022

(65) Prior Publication Data
US 2024/0260609 A1 Aug. 8, 2024

Related U.S. Application Data

(60) Provisional application No. 63/208,794, filed on Jun. 9, 2021.

(51) Int. Cl.
*A23K 10/20* (2016.01)
*A23K 20/163* (2016.01)
*A23K 20/26* (2016.01)

(52) U.S. Cl.
CPC ............ *A23K 10/20* (2016.05); *A23K 20/163* (2016.05); *A23K 20/26* (2016.05)

(58) Field of Classification Search
CPC ....... A23K 10/20; A23K 20/163; A23K 20/26
USPC ....................................... 426/623
See application file for complete search history.

(56) References Cited

U.S. PATENT DOCUMENTS

| | | | | |
|---|---|---|---|---|
| 2,767,097 A | * | 10/1956 | Schneider .............. | A22C 11/10 |
| | | | | 426/105 |
| 2,802,744 A | * | 8/1957 | Weingand ................. | D01F 9/04 |
| | | | | 426/106 |
| 4,868,002 A | * | 9/1989 | Scaglione ............... | A23L 13/67 |
| | | | | 425/308 |
| 5,731,029 A | * | 3/1998 | Karwowski ............ | A23K 50/42 |
| | | | | 426/805 |
| 7,604,829 B2 | | 10/2009 | Schopf | |
| 2006/0013939 A1 | * | 1/2006 | Schopf ................... | A23K 40/00 |
| | | | | 426/656 |
| 2009/0311390 A1 | | 12/2009 | Phelps | |
| 2015/0313268 A1 | * | 11/2015 | Kafer ....................... | A23B 4/03 |
| | | | | 198/606 |

FOREIGN PATENT DOCUMENTS

| | | | | |
|---|---|---|---|---|
| DE | 102016010661 A1 | | 3/2018 | |
| JP | 2012522502 A | * | 9/2012 | ............. A22C 11/00 |
| RU | 2010127613 A | * | 1/2012 | |

OTHER PUBLICATIONS

Database GNPD [Online] Mintel; May 20, 2021, anonymous: "Turkey, Chia & Coconut Dog Food", Database accession No. 8718579, 4 pages.

* cited by examiner

*Primary Examiner* — Erik Kashnikow
*Assistant Examiner* — Bhaskar Mukhopadhyay

(57) ABSTRACT

A cooked chunk pet food product is prepared by grinding animal muscle meat and animal organ meat and mixing the animal muscle meat and the animal organ meat in a ratio of muscle meat to organ meat of from about 1:1 to about 10:1 wt % in a mixer for from about 5 to 20 minutes to form a mixed meat component, mixing with additional ingredients to prepare a pet food base formulation that is disposed in a casing and cooked to provide a sliceable pet food log. The pet food log is then diced and/or shredded provide a chunk pet food product having an average piece size of from about 0.25 to about 0.75 inches in the largest dimension. Products made by the process are also described.

22 Claims, No Drawings

METHOD OF PREPARING A COOKED CHUNK PET FOOD PRODUCT

CROSS-REFERENCE TO RELATED APPLICATIONS

This application is a national phase application of PCT Application No. PCT/US2022/032808, filed 9 Jun. 2022, which claims the benefit of U.S. Provisional Patent Application No. 63/208,794, filed 9 Jun. 2021, each of which is hereby incorporated by reference in its entirety.

FIELD

The present invention relates to pet food. More specifically, the present application relates to oven cooked pet food.

BACKGROUND

Pet food products having the form of solid, meat-like chunks are described in U.S. Pat. No. 7,604,829. This pet food product is prepared by processing the ingredients to form an emulsion-like mixture, which is rapidly heated in a confined zone to allow the protein to coagulate Pressure at the downstream end of the confined processing zone is reduced to a value below the vapor pressure of the emulsion, thereby generating steam in situ in the emulsion. The presence of steam generated in the confined emulsion mass by the vaporization of water serves to further disrupt the emulsion mass into irregular individual chunks or pieces which are discharged from the tubular processing zone. An injector/shredder assembly is positioned in the zone to disrupt and shred the coagulated product mass and inject a colorant. The colorant adheres to some of the exterior surfaces of the final product to create a simulated grilled or roasted appearance.

SUMMARY

It has been found that a cooked chunk pet food product may be prepared on a commercial scale by a simple cooking process, whereby a pet food base formulation is mixed and disposed in a casing to provide an uncooked pet food log. The pet food log is then cooked to form a sliceable pet food log that is diced and/or shredded provide a chunk pet food product having an average piece size of from about 0.25 to about 0.75 inches in the largest dimension. The resulting chunk pet food product is then packaged in a format suitable for refrigeration or freezing. The present process facilitates preparation of a high protein, fresh pet food product without the need to use complicated and expensive plant equipment, such as extrusion technology.

In an aspect, a method of making a cooked chunk pet food product comprises grinding animal muscle meat and animal organ meat and mixing the animal muscle meat and the animal organ meat in a ratio of muscle meat to organ meat of from about 1:1 to about 10:1 wt % in a mixer for from about 5 to 20 minutes to form a mixed meat component. Additional ingredients are mixed with the mixed meat component to form a pet food base formulation comprising the mixed meat component in an amount of from about 64 to about 95 wt %, KCl and/or NaCl in an amount of from 0 to about 0.6 wt %, tricalcium phosphate (TCP) and/or dicalcium phosphate (DCP) in an amount of from 0 to about 2 wt %, Sugar in an amount of from 0 to about 0.5 wt %, a starch source selected from the group consisting of barley flour, rice flour, and oat fiber in an amount of from 0 to about 12 wt %, and added water in an amount of from about 5 to about 20 wt %.

The pet food base formulation is then disposed in a casing to provide an uncooked pet food log, and cooked to form a sliceable pet food log. The sliceable pet food log is diced and/or shredded to provide a chunk pet food product having an average piece size of from about 0.25 to about 0.75 inches in the largest dimension.

The chunk pet food product is then packaged in a format suitable for refrigeration or freezing.

In an aspect, the chunk pet food product as described herein may provide a number of beneficial characteristics. The unique use of animal muscle meat and animal organ meat of meat as described herein provides excellent nutrition profile with good organoleptic properties, such as good texture and "mouthfeel. In an aspect, the meat components used are all "human grade" ingredients, providing enhanced value to the ultimate chunk pet food product. In an aspect, the chunk pet food product comprises no more that 30% fat, with concomitant health benefits. Surprisingly, the chunk pet food product exhibits excellent cohesive properties even in the case where the chunk pet food product has a low fat content and a low or no added binder components.

is visually appealing, with apparent texture and optional visible inclusions. The product is high in protein and low in starch and undesirable components.

Because of the relatively mild preparation conditions, the chunk pet food product has not been subjected to unduly harsh cooking conditions, such as high pressure, providing substantial organoleptic benefits. The product therefore exhibits unique piece appearance and texture characteristics that are different from products prepared by a wet extrusion process. Moreover, the chunk pet food product contains a low amount of fines due to the relatively mild preparation conditions.

The present method provides a chunk pet food product in high yield both because of the simple process steps and the unique selection of ingredients. For this reason, cook yields may be observed in excess of 90%, and also dicing/shredding yields likewise may be observed in excess of 90%.

Additionally, the unique and simple processing steps and conditions provide substantial benefit in affording a simple, low-cost process that enables use of modular, non-specialized equipment that is both easy to operate and easy to expand to increase production. The equipment used in the present process is easy to operate, in contrast with extruders that are expensive, complex, require specialized installation, and require a high skill level for operation.

DETAILED DESCRIPTION

The aspects of the present invention described below are not intended to be exhaustive or to limit the invention to the precise forms disclosed in the following detailed description. Rather a purpose of the aspects chosen and described is by way of illustration or example, so that the appreciation and understanding by others skilled in the art of the general principles and practices of the present invention can be facilitated.

The meat source of the animal-sourced meat used in the present mixed meat component may be any from any species. Suitable meats include those obtained from bovine, porcine, equine, caprine, ovine, avian animals, or any animal commonly slaughtered for food production. Bovine animals may include, but are not limited to, buffalo, and all cattle, including steers, heifers, cows, and bulls. Porcine animals may include, but are not limited to, feeder pigs and breeding pigs, including sows, gilts, barrows, and boars. Ovine animals may include, but are not limited to, sheep, including ewes, rams, wethers, and lambs. Poultry may include, but are not limited to, chicken, turkey, and ostrich. Mixtures of such meat sources are also contemplated. In an aspect, the meat source of the animal-sourced meat used in the present mixed meat component is selected from beef, pork, turkey, chicken, or mixtures thereof.

In an aspect, the animal muscle meat is selected from the group consisting of trim muscle meat, mechanically separated animal muscle meat, and mixtures thereof.

In an aspect, the animal muscle meat is trim meat obtained as a secondary product of processing animals for obtaining high value cuts of meat. In an aspect, the animal muscle meat is obtained by mechanically separating meat from bones during processing of animals for obtaining high value cuts of meat. Mechanical separation methods are often used in processing of poultry.

In an aspect, the animal organ meat is selected from organs considered to be suitable for human consumption, even though the resulting product is intended for use as pet food. It has been found that selection of organ meats in this manner enhances the quality of the final chunk pet food product in palatability and is recognized by pet owners as enhancing value and quality of the product. In an aspect, the animal organ meat is selected from the group consisting of heart, liver, and mixtures thereof It has been discovered that the presence of organ meat in the indicated amounts imparts a positive impact on palatability of the ultimate cooked chunk pet food product, thereby achieving excellent acceptance of the meat chunk food by pets. It further has been found that mixed meat components comprising both types of meat exhibit excellent texture properties providing excellent processing characteristics and mouth feel. However, it has also been found that when the amount of organ meat in the ultimate cooked chunk pet food product is in excess of amounts indicated herein, the texture and binding properties of the ultimate cooked chunk pet food product are adversely affected.

In an aspect, the mixed meat component comprises a mixture of animal muscle meat and animal organ meat in a ratio of muscle meat to organ meat of from about 2:1 to about 10:1 wt %. In an aspect, the mixed meat component comprises a mixture of animal muscle meat and animal organ meat in a ratio of muscle meat to organ meat of from about 3:1 to about 10:1 wt %. In an aspect, the mixed meat component comprises a mixture of animal muscle meat and animal organ meat in a ratio of muscle meat to organ meat of from about 4:1 to about 10:1 wt %. In an aspect, the mixed meat component comprises a mixture of animal muscle meat and animal organ meat in a ratio of muscle meat to organ meat of from about 2:1 to about 6:1 wt %. In an aspect, the mixed meat component comprises a mixture of animal muscle meat and animal organ meat in a ratio of muscle meat to organ meat of from about 3:1 to about 6:1 wt %.

In an aspect, the meat used in the mixed meat component is ground to a size of from about 0.2 to about 0.3 inch grind. In an aspect, the mixed meat component is ground using grinding plate having a hole size of from 3/32 inch to 3/16 inch. In an aspect, the mixed meat component is ground using grinding plate having a hole size of from 1/8 inch to 5/32 inch.

The thus ground mixed meat component is mixed in a mixer for from about 5 to 20 minutes to form a mixed meat component. In an aspect, the thus ground mixed meat component is mixed in a mixer for from about 8 to 15 minutes to form a mixed meat component. While not being bound by theory, it is believed that this mixing step assists in extraction of myosin from the meat matrix, which provides enhanced binding during formation of the sliceable pet food log.

As noted above, the mixed meat component is mixed with additional ingredients to form a pet food base formulation.

In an aspect, the pet food base formulation comprises the animal muscle meat in an amount of from about 50 to about 80 wt % and the animal organ meat in an amount of from about 8 to about 26 wt.

The pet food base formulation comprises KCl and/or NaCl in an amount of from 0 to about 0.6 wt %. It has been found that incorporation of these salts in the present pet food base formulation assists in the extraction of myosin from the meats, which is of benefit in providing enhanced binding during formation of the sliceable pet food log.

It has been found that addition of these in the present pet food base formulation in amounts higher than indicated is not desirable in pet foods.

The pet food base formulation comprises tricalcium phosphate (TCP) and/or dicalcium phosphate (DCP) in an amount of from 0 to about 2 wt %, or in an aspect the pet food base formulation comprises tricalcium phosphate (TCP) and/or dicalcium phosphate (DCP) in an amount of from 0 to about 1 wt %. It has been found that incorporation of these phosphates in the indicated amounts improves water binding and protein functionality in the present pet food base formulation. These phosphates additionally may be beneficial to maintain nutrient adequacy and to meet requirements for calcium, phosphate, and the calcium phosphate ratio of pet foods.

The pet food base formulation comprises sugar in an amount of from 0 to about 0.5 wt %. It has been found that incorporation of sugar in the present pet food base formulation and improves water binding and adds flavor.

The pet food base formulation comprises a starch source selected from the group consisting of barley flour, rice flour, and oat fiber in an amount of from 0 to about 12 wt %. In an aspect, the pet food base formulation comprises a starch source selected from the group consisting of barley flour, rice flour, and oat fiber in an amount of from 0 to about 7 wt %. It has been found that incorporation of these selected starch sources improves water binding and final texture of the pet food product.

The pet food base formulation comprises added water in an amount of from about 5 to about 20 wt %. In an aspect, the pet food base formulation comprises added water in an amount of from about 8 to about 13 wt %. It has been found that incorporation of added water in the indicated amounts advantageously affects the final texture of the pet food product.

In an aspect, the pet food base formulation additionally comprises a preservative. In an aspect, the preservative limited to naturally obtained components, such as citric acid and vinegar.

In an aspect, the pet food base formulation comprises fat in an amount of about 10% to about 20% by weight. In an aspect, the pet food base formulation comprises fat in an amount of about 10% to about 15% by weight. In an aspect, the pet food base formulation comprises fat in an amount of about 15% to about 20% by weight. In an aspect, the fat is present in the pet food base formulation as a component of the meat used in the pet food base formulation. In an aspect, at least a portion of the fat present in the pet food base formulation as added as a separate ingredient to the pet food base formulation.

In an aspect, the pet food base formulation comprises added nutrients to provide a nutrient profile appropriate for pets. In an aspect, the pet food base formulation comprises added nutrients in the form of a macro mineral mix.

In an aspect, the chunk pet food product additionally comprises visibly apparent non-meat inclusions that are added with mixing to the pet food base formulation before disposing the pet food base formulation in a casing and cooking. For purposes of the present discussion, non-meat inclusions are visibly apparent if they can be visibly identified as component separate from the pet food base formulation by the unaided eye. In an aspect, the visibly apparent non-meat inclusions have a size in at least one dimension of at least 0.2 cm. In an aspect, the visibly apparent non-meat inclusions have a size in at least one dimension of at least 0.3 cm. In an aspect, the visibly apparent non-meat inclusions have a size in at least one dimension of at least 0.4 cm. In an aspect, the visibly apparent non-meat inclusions have a size in at least one dimension of at least 0.5 cm.

In an aspect, the non-meat inclusions are added in an amount of from 0 to about 30 parts to 100 parts of the pet food base formulation. In an aspect, non-meat inclusions are added in an amount of from about 5 to about 30 parts to 100 parts of the pet food base formulation. In an aspect, non-meat inclusions are added in an amount of from about 10 to about 30 parts to 100 parts of pet food base formulation. In an aspect, non-meat inclusions are added in an amount of from about 5 to about 25 parts to 100 parts of the pet food base formulation. In an aspect, non-meat inclusions are added in an amount of from about 10 to about 25 parts to 100 parts of the pet food base formulation.

In an aspect, the non-meat inclusions are selected from the group consisting of chia seeds, apple, blueberry, cranberry, broccoli, carrots, green beans, butternut squash, kale, pea, potato, pumpkin, spinach, squash, sweet potato, and tomato.

In an aspect, the non-meat inclusions are dehydrated when mixed with the mixed meat component. In an aspect, additional water is added at the time that the dehydrated non-meat inclusions are mixed with the mixed meat component.

The thus prepared pet food base formulation (optionally with non-meat inclusions) is disposed in a casing to provide an uncooked pet food log for cooking. It has been found that placement of the pet food base formulation in a casing compacts the ingredients of the pet food base formulation together at an appropriate, low pressure to consolidate the ingredients into a mass that retains good structural integrity after cooking, thereby preparing a pet food log that may be sliced using conventional industrial slicing equipment (i.e., a sliceable pet food log).

The use of casings as described herein provides a simplified process wherein the uncooked pet food log can be cooked without resort to expensive equipment such as extruders that are expensive and require skilled technicians to operate. The use of casings as described herein also provides an advantage over simply cooking the pet food base formulation in pans in an oven, because the ingredients of the pet food base formulation are advantageously pressed together with the proper light pressure, while at the same time avoiding the clean-up of cooking pans that would be required in other oven processes.

The casings to be used in the present process many be of any size and shape suitable for complete cooking of the uncooked pet food log in a commercially appropriate time.

In an aspect, the casing is sized to provide cylindrical shaped tubes of a diameter of from about 5 inches to about 10 inches; and a length of from about 15 inches to about 40 inches.

In an aspect, the casing is prepared from any material suitable for food contact, strong enough to hold the pet food base formulation without rupturing, and thermally stable with respect to the cooking temperature conditions of the cooking step. In an aspect, the casing may be a cellulose casing, including casings made from cotton bags and derived from processed cotton linters. In an aspect, the casing may be a fibrous casing, such as a large diameter cellulose casing prepared by impregnating a strong paper-like material with cellulose. In an aspect, the casing may be a moisture impermeable plastic casing, such as casings prepared from PVDC.

Cook in casings provides good binding effect without imparting excessive pressure. Not cooked in open pans or pans with covers—reproducible containment pressure and ease in product handling because cooked product does not stick to pans.

The uncooked pet food log is cooked for a time and temperature sufficient to form a sliceable pet food log. In an aspect, the uncooked pet food log is cooked to an internal temperature of from about 135° F. to about 185° F. In an aspect, the uncooked pet food log is cooked to an internal temperature of from 155° F. to about 170° F.

In an aspect, the uncooked pet food log is cooked in a batch oven. In an aspect, the uncooked pet food log is cooked in a convection oven. In an aspect, the uncooked pet food log is cooked in an oven at a humidity of at least about 80%. In an aspect, the uncooked pet food log is cooked in an oven at a humidity of at least about 90%. In an aspect, the uncooked pet food log is cooked in an oven at a humidity of at least about 95%. In an aspect, the uncooked pet food log is cooked in an oven at 100% humidity. In an aspect, the uncooked pet food log is cooked in an oven comprising modulating, forced-air recirculation with optional humidity control. An example of a commercially available an oven comprising modulating, forced-air recirculation with optional humidity control is the ALKAR Small Oven.

In an aspect, the sliceable pet food log is not exposed to a pressure greater than about 8 bar during preparation and cooking. In an aspect, the sliceable pet food log is not exposed to a pressure greater than about 5 bar during preparation and cooking. In an aspect, the sliceable pet food log is not exposed to a pressure greater than about 3 bar during preparation and cooking. This provides a significant advantage over conventional food production processes using extrusion, where extruded food products may be exposed to pressures of 10 to 20 bar.

The sliceable pet food log is then diced and/or shredded to provide a chunk pet food product having an average piece size of from about 0.25 to about 0.75. In an aspect, the sliceable pet food log is diced and/or shredded to provide a chunk pet food product having an average piece size of from about 0.25 to about 0.5 in the largest dimension.

In an aspect, the sliceable pet food log is sliced to a thickness of from about 0.25 inch to about 1 inch prior to dicing and/or shredding to facilitate a subsequent dicing and/or shredding step. It has been found that slicing of the sliceable pet food log prior to dicing and/or shredding advantageously increases the efficiency of the dicing and/or shredding. It has additionally been found that slicing of the sliceable pet food log prior to dicing and/or shredding advantageously reduces generation of fines that are not desired in the final chunk pet food product.

In an aspect, the sliceable pet food log is diced and/or shredded to provide a chunk pet food product having piece size distribution as follows, as determined by sieve analysis described in Table 1.

TABLE 1

| Sieve size | Wt Percentage in chunk pet food product |
| --- | --- |
| Larger pieces | Less than 2% |
| 16 mm (5/8 inch) | 35-55% |
| 12.5 mm (½ inch) | 25-45% |
| 11.2 mm (7/16 inch) | 20-25% |
| 9.5 mm (3/8 inch) | 10-15% |
| 6.3 mm (1/4 inch) | 0-12% |
| 3.18 mm (1/8 inch) | 0-8% |
| fines | Less than 2% |

The sliceable pet food log is diced and/or shredded using any suitable equipment, such as dicing equipment such as the Affinity™ and DiversaCut™ dicers manufactured by Urschel Laboratories.

In an aspect, the sliceable pet food log prepared by the cooking step is chilled to a temperature of from about 32° F. to about 40° F. prior to optional slicing and prior to being diced and/or shredded to provide a chunk pet food product. In an aspect, the sliceable pet food log prepared by the cooking step is chilled to a temperature of from about 32° F. to about 35° F. prior to optional slicing and prior to being diced and/or shredded to provide a chunk pet food product. In an aspect, the sliceable pet food log prepared by the cooking step is chilled to a temperature of about 34° F. or to optional slicing and prior to being diced and/or shredded to provide a chunk pet food product.

In an aspect, the chunk pet food product (i.e., the product after cooking and as packaged) comprises at least 65% meat. In an aspect, the chunk pet food product comprises at least 70% meat. In an aspect, the chunk pet food product comprises at least 75% meat. In an aspect, the chunk pet food product comprises at least 80% meat. In an aspect, the chunk pet food product comprises at least 85% meat.

In an aspect, the chunk pet food product is packaged for delivery to the consumer in a refrigerated state. In an aspect, the chunk pet food product is packaged for delivery to the consumer in a fresh, never frozen, refrigerated state. In an aspect, the chunk pet food product is packaged for delivery to the consumer in a frozen state.

In an aspect, the packaging format suitable for distribution is an airtight package suitable for storage, transport and presentation to the consumer. The packaging may be of a bulk, shipping, or individual serving type: wherein the container is a formable pouch, injectable pouch, sealable pouch, formable tray, vacuum formable tray or pouch, heat formable tray or pouch, or film covered tray. In an aspect, the chunk pet food product is disposed in a resealable pouch. In an aspect, the chunk pet food product is disposed in a stand-up resealable pouch.

In an aspect, the chunk pet food product is disposed in package comprising a modified atmosphere to maintain freshness. In an aspect, the modified atmosphere comprises 80% $N_2$ and 20% $CO_2$.

In an aspect, the present process is carried out under commercial scale and sanitary conditions, wherein at least about 1000 of chunk pet food product are produced in a four hour period. In an aspect, the present process is carried out under commercial scale and sanitary conditions, wherein from about 1000 to about 10,000 pounds of chunk pet food product are produced in a four hour period. In an aspect, the present process is carried out under commercial scale and sanitary conditions, wherein from about 1000 to about 5,000 pounds of chunk pet food product are produced in a four hour period. In an aspect, the present process is carried out in combination with periodic testing of product to determine nutritional information. In an aspect, the present process is carried out in combination with periodic testing of product to identify potential pathogens. In an aspect, the present process is carried out in combination with periodic testing of product to identify potential trace impurities.

In an aspect, the chunk pet food product is substantially free of additional added binder. In an aspect, the chunk pet food product is substantially free of hydrocolloids selected from the group consisting of one or more of locust bean gum, carrageenan (seaweed extract), guar gum, xanthan gum, gellan gum, scleroglucan, agar, pectin, alginate, gum acacia, and gelatin. Exclusion of one or more of these ingredients from the chunk pet food product is beneficial in reducing the number of additives incorporated into the product, advantageously reducing cost and also simplifying the ingredient list that must be reported to customers. It has been found to be desirable in the pet food industry to provide products having a reduced number of ingredients or in an aspect a "clean label" panel of ingredients where possible, which is valued by many consumers.

As used herein, the terms "about" or "approximately" mean within an acceptable range for the particular parameter specified as determined by one of ordinary skill in the art, which will depend in part on how the value is measured or determined, e.g., the limitations of the sample preparation and measurement system. Examples of such limitations include preparing the sample in a wet versus a dry environment, different instruments, variations in sample height, and differing requirements in signal-to-noise ratios. For example, "about" can mean greater or lesser than the value or range of values stated by $1/10$ of the stated values, but is not intended to limit any value or range of values to only this broader definition. For instance, a concentration value of about 30% means a concentration between 27% and 33%. Each value or range of values preceded by the term "about" is also intended to encompass the embodiment of the stated absolute value or range of values. Alternatively, particularly with respect to biological systems or processes, the term can mean within an order of magnitude, preferably within 5-fold, and more preferably within 2-fold, of a value.

Throughout this specification and claims, unless the context requires otherwise, the word "comprise", and variations such as "comprises" and "comprising", will be understood to imply the inclusion of a stated integer or step or group of integers or steps but not the exclusion of any other integer or step or group of integer or step. When used herein "consisting of" excludes any element, step, or ingredient not specified in the claim element. When used herein, "consisting essentially of" does not exclude materials or steps that do not materially affect the basic and novel characteristics of the claim. In the present disclosure of various embodiments, any of the terms "comprising", "consisting essentially of" and "consisting of" used in the description of an embodiment may be replaced with either of the other two terms.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of making a cooked chunk pet food product comprising;

a) grinding animal muscle meat and animal organ meat and mixing the animal muscle meat and the animal organ meat in a ratio of muscle meat to organ meat of from about 2:1 to about 10:1 wt % in a mixer for from about 5 to 20 minutes to form a mixed meat component;

b) mixing additional ingredients with the mixed meat component to form a pet food base formulation comprising the mixed meat component in an amount of from about 64 to about 95 wt %, KCl and/or NaCl in an amount of from 0 to about 0.6 wt %, tricalcium phosphate (TCP) and/or dicalcium phosphate (DCP) in an amount of from about 0.01 wt % to about 2 wt %, sugar in an amount of from 0 to about 0.5 wt %, a starch source selected from the group consisting of barley flour, rice flour, and oat fiber in an amount of from 0 to about 12 wt %, and added water in an amount of from about 5 to about 20 wt %;

c) disposing the pet food base formulation in a casing to provide an uncooked pet food log;

d) cooking the uncooked pet food log in the casing to an internal temperature of from about 135° F. to about 185° F. to form a sliceable pet food log;

e) dicing and/or shredding the sliceable pet food log to provide a chunk pet food product having an average piece size of from about 0.25 to about 0.75 inches in the largest dimension; and f) packaging the chunk pet food product in a format suitable for refrigeration or freezing.

2. The method of claim 1, wherein the animal muscle meat is selected from the group consisting of trim muscle meat, mechanically separated animal muscle meat, and mixtures thereof.

3. The method of claim 1, wherein the animal organ meat is selected from the group consisting of heart, liver, and mixtures thereof.

4. The method of claim 1, wherein the meat source of the animal muscle meat and the animal organ meat is selected from the group consisting of beef, pork, turkey, chicken, and mixtures thereof.

5. The method of claim 1, wherein the pet food base formulation comprises the animal muscle meat in an amount of from about 50 to about 80 wt % and the animal organ meat in an amount of from about 8 to about 26 wt %.

6. The method of claim 1, wherein the chunk pet food product additionally comprises visibly apparent non-meat inclusions that are added with mixing to the pet food base formulation before disposing the pet food base formulation in a casing and cooking.

7. The method of claim 6, wherein the visibly apparent non-meat inclusions have a size in at least one dimension of at least 0.2 cm.

8. The method of claim 6, wherein the non-meat inclusions are added in an amount of from about 5 to about 30 parts to 100 parts of the pet food base formulation.

9. The method of claim 6, wherein the non-meat inclusions are selected from the group consisting of chia seeds, apple, blueberry, cranberry, broccoli, carrots, green beans, butternut squash, kale, pea, potato, pumpkin, spinach, squash, sweet potato, and tomato.

10. The method of claim 6, wherein the non-meat inclusions are dehydrated when mixed with the mixed meat component.

11. The method of claim 1, wherein the uncooked pet food log is cooked in a batch oven; or wherein the uncooked pet food log is cooked in a convection oven; or wherein the uncooked pet food log is cooked in an oven comprising modulating, forced-air recirculation with optional humidity control.

12. The method of claim 1, wherein the sliceable pet food log is not exposed to a pressure greater than about 8 bar during preparation and cooking.

13. The method of claim 1, wherein the sliceable pet food log is diced and/or shredded to provide a chunk pet food product having an average piece size of from about 6 mm (0.23 inch) to about 11 mm (0.43 inches) in the largest dimension.

14. The method of claim 1, wherein the sliceable log meat product is diced and/or shredded to provide a chunk pet food product having piece size distribution as determined by sieve analysis of

| Sieve size | Wt Percentage in chunk pet food product |
| --- | --- |
| Larger pieces | Less than 2% |
| 16 mm (5/8 inch) | 35-55% |
| 12.5 mm (½ inch) | 25-45% |
| 11.2 mm (7/16 inch) | 20-25% |
| 9.5 mm (3/8 inch) | 10-15% |
| 6.3 mm (1/4 inch) | 0-12% |
| 3.18 mm (1/8 inch) | 0-8% |
| fines | Less than 2%. |

15. The method of claim 1, wherein the pet food log is sliced to a thickness of from about 0.25 inch to about 1 inch prior to dicing and/or shredding.

16. The method of claim 1, wherein the sliceable pet food log prepared by the cooking step is chilled to a temperature of from about 32° F. to about 40° F. prior to being diced and/or shredded to provide a chunk pet food product.

17. The method of claim 1, wherein the chunk pet food product is packaged for delivery to the consumer in a refrigerated state; or wherein the chunk pet food product is packaged for delivery to the consumer in a fresh, never frozen, refrigerated state; or wherein the chunk pet food product is packaged for delivery to the consumer in a frozen state.

18. The method of claim 1, wherein the chunk pet food product is disposed in a resealable pouch; or wherein the chunk pet food product is disposed in a stand-up resealable pouch.

19. The method of claim 1, wherein the chunk pet food product comprises at least 65 wt % meat.

20. The method of claim 1, wherein the casing compacts the pet food base formulation.

21. The method of claim 1, wherein the method is carried out under commercial scale and sanitary conditions, wherein at least about 1000 pounds of chunk pet food product are produced in a four hour period.

22. The method of claim 1, wherein the tricalcium phosphate (TCP) and/or dicalcium phosphate (DCP) is present in an amount of from about 1 wt % to about 2 wt %.

\* \* \* \* \*